(12) United States Patent
Ozawa

(10) Patent No.: US 7,860,294 B2
(45) Date of Patent: Dec. 28, 2010

(54) MAGNETIC INK CHARACTER READING APPARATUS AND METHOD OF CONTROLLING THE SAME

(75) Inventor: Masamitsu Ozawa, Shizuoka (JP)

(73) Assignee: Star Micronics Co., Ltd., Shizuoka (JP)

( * ) Notice: Subject to any disclaimer, the term of this patent is extended or adjusted under 35 U.S.C. 154(b) by 789 days.

(21) Appl. No.: 11/847,490

(22) Filed: Aug. 30, 2007

(65) Prior Publication Data

US 2009/0008451 A1 Jan. 8, 2009

(30) Foreign Application Priority Data

Aug. 31, 2006 (JP) ............................. 2006-234983

(51) Int. Cl.
*G06K 9/00* (2006.01)

(52) U.S. Cl. ...................................... 382/139; 235/449
(58) Field of Classification Search ................. 382/139, 382/140; 705/45; 235/449
See application file for complete search history.

(56) References Cited

U.S. PATENT DOCUMENTS

| 7,349,566 B2* | 3/2008 | Jones et al. | 382/139 |
| 2002/0103757 A1* | 8/2002 | Jones et al. | 705/45 |
| 2002/0136442 A1* | 9/2002 | Jones et al. | 382/135 |
| 2003/0202690 A1* | 10/2003 | Jones et al. | 382/139 |

* cited by examiner

*Primary Examiner*—Brian Q Le
(74) *Attorney, Agent, or Firm*—Pearne & Gordon LLP

(57) ABSTRACT

A magnetic ink character reading apparatus includes a similarity acquisition unit, a character recognition unit and a character recognition limiting unit. The similarity acquisition unit acquires a similarity between one-character-corresponding data extracted from detection result data and reference data corresponding to each of the magnetic ink characters. The character recognition unit recognizes the magnetic ink character having the highest similarity as the magnetic ink character corresponding to the one-character-corresponding data. When the difference between the highest similarity and the second highest similarity among the similarities acquired is smaller than a predetermined reference difference, the character recognition limiting unit limits the determination that the magnetic ink character having the highest similarity is the magnetic ink character corresponding to the one-character.

9 Claims, 13 Drawing Sheets

FIG. 2
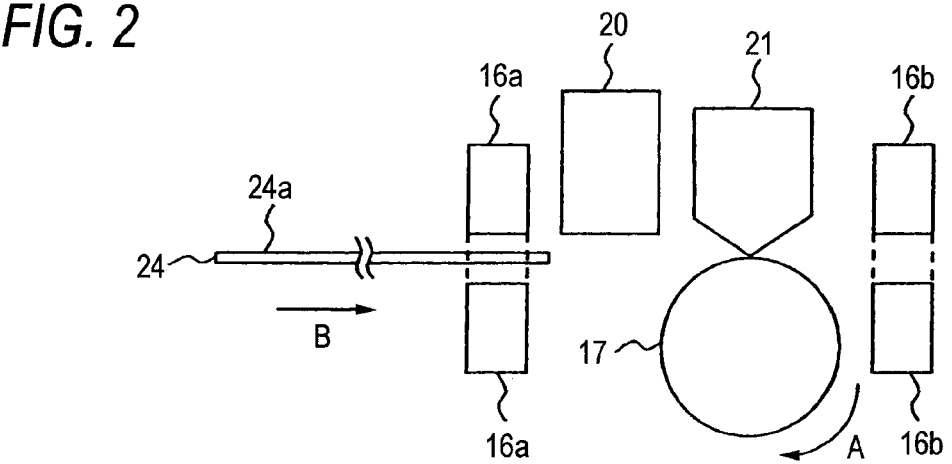
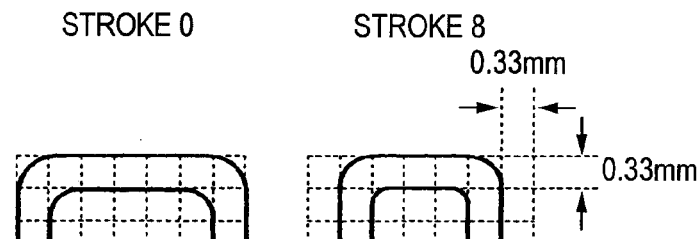
FIG. 3A
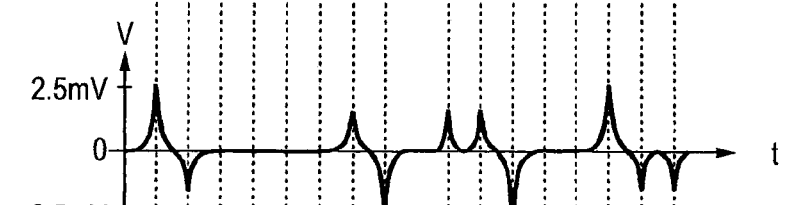
FIG. 3B
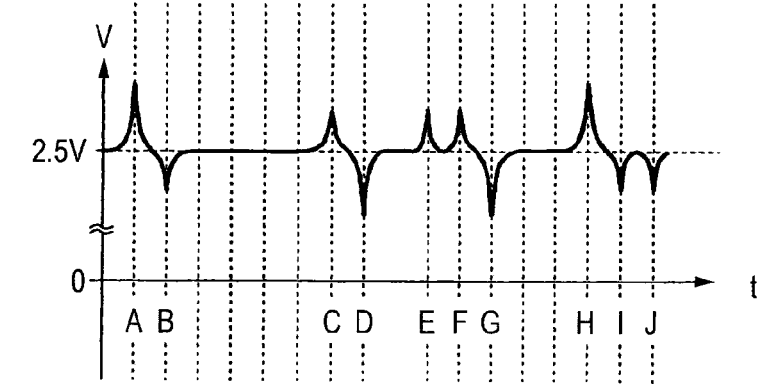
FIG. 3C (512, · · ·, 520, 522, 521, · · ·)

| MAGNETIC INK CHARACTERS | REFERENCE VALUE SEQUENCE |
|---|---|
| STROKE 0 | ( 532, 521, · · · ) |
| STROKE 1 | · · · |
| STROKE 2 | · · · |
| STROKE 3 | · · · |
| STROKE 4 | · · · |
| STROKE 5 | · · · |
| STROKE 6 | · · · |
| STROKE 7 | · · · |
| STROKE 8 | · · · |
| STROKE 9 | · · · |
| STROKE 10 | · · · |
| STROKE 11 | · · · |
| STROKE 12 | · · · |
| STROKE 13 | · · · |

| NUMBER | REFERENCE CHARACTER NUMBER |
|---|---|
| 1 | 5 |
| 2 | 8 |
| 3 | 12 |

MAGNETIC INK CHARACTER READING APPARATUS AND METHOD OF CONTROLLING THE SAME

CROSS REFERENCE TO RELATED APPLICATION

This application claims priority from a Japanese Patent Application No. 2006-234983 filed on Aug. 31, 2006, the entire subject matter of which is incorporated herein by reference.

TECHNICAL FIELD

The present invention relates to a magnetic ink character reading apparatus and a method of controlling the same.

BACKGROUND

In the known art, magnetic ink character reading apparatuses are known which have a magnetic head that detects a variation in magnetic flux intensities on magnetic ink characters (MIRC character: Magnetic Ink Character Recognition characters). In the magnetic ink character reading apparatuses, a character recognition process is performed based on detection result data indicative of the detection result of the magnetic head so as to recognize the magnetic ink characters recorded on a recording medium on a character-by-character basis.

For example, a magnetic ink character reading apparatus is known which has a function of reading magnetic ink characters recorded on a recording medium and a function of printing images on the recording medium. Such a magnetic ink character reading apparatus is used for clearing checks in a retail store or the like. When the clerk in the retail store receives a check from buyers, the store's identification information, the amount of the check, and the like are printed on the check. In this printing process, the print function of the magnetic ink character reading apparatus is used. Then, the buyers confirm the store's identification information, the amount of the check, or the like printed on the check, and writes down their signatures on the check. When the clerk receives the signed check, an account number and the like printed on the surface of the check using the magnetic ink characters are read by the magnetic ink character reading apparatus. The read account number and the like are transmitted to a host computer in order to validate the account number or the like. When the validity of the account number or the like is approved, the effect of the validity is printed on the check using the print function and thus the check clearing process is completed.

In a general magnetic ink character reading apparatus, the magnetic ink characters recorded on the recording medium are recognized in the following manner. The magnetic ink character reading apparatus extracts one-character-corresponding data (i.e., data corresponding to one character) from detection result data in a sequential manner and acquires a similarity between reference data of each of the magnetic ink characters and the one-character-corresponding data. Thereafter, the magnetic ink character reading apparatus recognizes the magnetic ink character having the highest similarity as the magnetic ink character corresponding to the one-character-corresponding data (i.e., the magnetic ink character recorded on the recording medium).

SUMMARY

However, when the magnetic ink characters recorded on the recording medium are recognized in the manner described above, the magnetic ink characters may be misrecognized. For example, when the difference between the highest similarity and the second highest similarity is small, the magnetic ink character having the second highest similarity may possibly be the right magnetic ink character that is recorded on the recording medium.

The invention has been made in view of these problems, and an object of the invention is to provide a magnetic ink character reading apparatus and a method of controlling the same capable of reducing misrecognition of magnetic ink characters recorded on a recording medium.

According to an aspect of the invention, there is provided a magnetic ink character reading apparatus including a magnetic head that detects a variation in magnetic flux intensities on magnetic ink characters, in which a character recognition process is performed based on detection result data indicative of the detection result of the magnetic head so as to recognize the magnetic ink characters recorded on a recording medium on a character-by-character basis, the apparatus including: a reference data acquisition unit that acquires reference data corresponding to a plurality of magnetic ink characters, respectively; a one-character-corresponding data acquisition unit that extracts data corresponding to one character from the detection result data; a similarity acquisition unit that acquires a similarity between the one-character-corresponding data and reference data corresponding to the magnetic ink characters, the similarity acquisition being performed for each of the plurality of magnetic ink characters; a character recognition unit that recognizes the magnetic ink character of which the similarity acquired by the similarity acquisition unit is the highest among the plurality of magnetic ink characters as the magnetic ink character corresponding to the one-character-corresponding data; a similarity difference determining unit that determines whether a difference between the highest similarity and the second highest similarity among the similarities acquired by the similarity acquisition unit is smaller than a predetermined reference difference; and a character recognition limiting unit that limits the recognition of the character recognition unit based on the determination result of the similarity difference determining unit.

According to another aspect of the invention, there is provided a method of controlling a magnetic ink character reading apparatus including a magnetic head that detects a variation in magnetic flux intensities on magnetic ink characters, in which a character recognition process is performed based on detection result data indicative of the detection result of the magnetic head so as to recognize the magnetic ink characters recorded on a recording medium on a character-by-character basis, the method including: acquiring reference data corresponding to a plurality of magnetic ink characters, respectively; extracting data corresponding to one character from the detection result data; acquiring a similarity between the one-character-corresponding data and reference data corresponding to the magnetic ink characters, the similarity acquisition being performed for each of the plurality of magnetic ink characters; recognizing the magnetic ink character of which the similarity acquired in the similarity acquisition step is the highest among the plurality of magnetic ink characters as the magnetic ink character corresponding to the one-character-corresponding data; determining whether a difference between the highest similarity and the second highest similarity among the similarities acquired in the similarity acquisition is smaller than a predetermined reference difference; and limiting the recognition in the character recognition based on the determination result in the similarity difference determining.

The invention according to above aspect relates to a magnetic ink character reading apparatus having a magnetic head that detects a variation in magnetic flux intensities on magnetic ink characters, in which a character recognition process is performed based on detection result data indicative of the detection result of the magnetic head so as to recognize the magnetic ink characters recorded on a recording medium on a character-by-character basis. In the invention, reference data corresponding to a plurality of magnetic ink characters are acquired respectively. In addition, one-character-corresponding data (data corresponding to one character) are extracted from the detection result data. A similarity between the one-character-corresponding data and reference data corresponding to the magnetic ink characters is acquired for each of the plurality of magnetic ink characters. The magnetic ink character having the highest similarity among the plurality of magnetic ink characters is recognized as the magnetic ink character corresponding to the one-character-corresponding data. In the invention, when the difference between the highest similarity and the second highest similarity among the similarities acquired is smaller than a predetermined reference difference, the recognition that the magnetic ink character having the highest similarity among the plurality of magnetic ink characters is the magnetic ink character corresponding to the one-character-corresponding data is limited. Accordingly, it is possible to reduce misrecognition of the magnetic ink characters recorded on the recording medium.

In the aspects of the invention, the magnetic ink character reading apparatus may further include: a similarity determining unit that determines whether the highest similarity among the similarities acquired by the similarity acquisition unit is smaller than a predetermined reference similarity; and a second character recognition limiting unit that limits the recognition of the character recognition unit based on the determination result of the similarity determining unit.

In the aspects of the invention, the magnetic ink character reading apparatus may further include a recognition-completed character number information storage unit that stores recognition-completed character number information for specifying the number of recognition-completed characters. When the recognition of the character recognition unit is limited, the apparatus may cause the magnetic head to redetect the variation in the magnetic flux intensities on the magnetic ink characters recorded on the recording medium, and thereafter the character recognition process is performed based on redetection result data indicative of the redetection result of the magnetic head. When the character recognition process is performed based on the redetection result data, a portion of the character recognition process may be omitted based on the number of characters specified by the recognition-completed character number information.

In the aspects of the invention, the similarity acquisition unit may acquire the similarity for each of the plurality of magnetic ink characters in a sequential manner. The apparatus may further include: a second similarity determining unit that, whenever the similarity is acquired by the similarity acquisition unit, determines whether the similarity is greater than a second predetermined reference similarity; and a second character recognition unit that, when it is determined that the similarity of one of the plurality of magnetic ink characters is greater than the second predetermined reference similarity, recognizes the one magnetic ink character as the magnetic ink character corresponding to the one-character-corresponding data. When the recognition of the second character recognition unit is performed, the similarity acquisition of the similarity acquisition unit may be limited.

BRIEF DESCRIPTION OF THE DRAWINGS

In the accompanying drawings:

FIG. 2 is a schematic diagram showing mechanisms of a magnetic ink character reading unit;

FIGS. 3A to 3C are diagrams showing an example of magnetic ink characters and the signals outputted at the time of reading the magnetic ink characters;

FIG. 14 shows an example of a sheet on which a character string is printed using magnetic ink characters;

DETAILED DESCRIPTION

Hereinafter, an embodiment of the invention will be described in detail with reference to the drawings.

Figure 1:
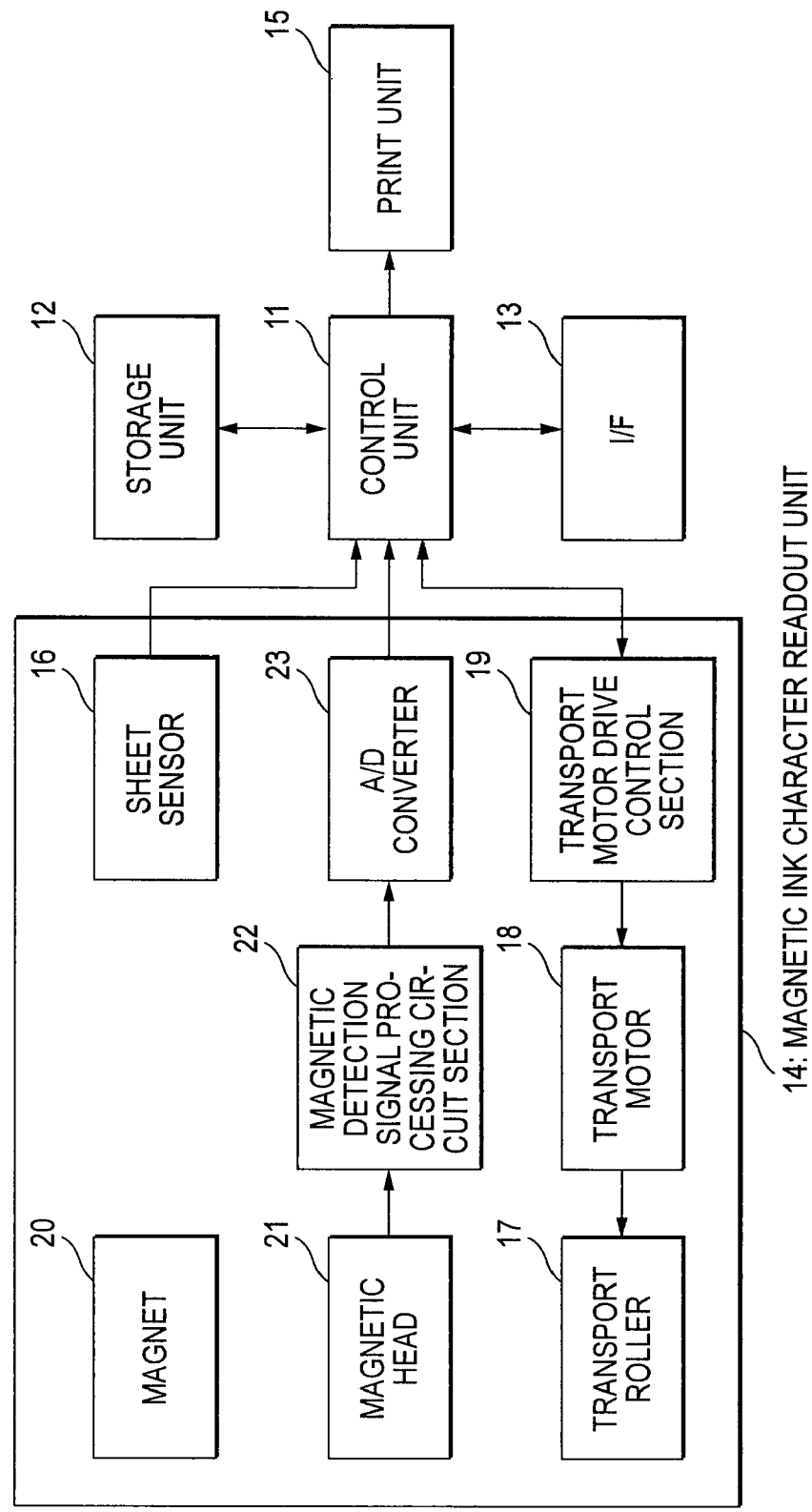
FIG. 1 is a diagram showing the entire configuration of a magnetic ink character reading apparatus in accordance with an embodiment of the invention.

FIG. 1 is a diagram showing the entire configuration of a magnetic ink character reading apparatus in accordance with an embodiment of the invention. As shown in FIG. 1, a magnetic ink character reading apparatus 10 of the present embodiment includes a control unit 11, a storage unit 12, an interface (I/F) 13, a magnetic ink character reading unit 14, and a print unit.

The control unit 11 operates in accordance with a program stored in the storage unit 12 and controls the entire operations of the magnetic ink character reading apparatus 10. The storage unit 12 includes a computer-readable information storage medium such as ROM (Read Only Memory) or RAM (Random Access Memory). The storage unit 12 also operates as a work memory that stores various data required for execution of various processes.

The interface 13 is provided for communication with a host computer (not shown). The interface 13 sends various data to the host computer in accordance with instructions from the control unit 11. For example, various status information of the magnetic ink character reading apparatus 10 and the detection result of the magnetic ink characters printed on a sheet (or recorded on the recording medium) are supplied to the host computer via the interface 13. Moreover, the interface 13 receives various data from the host computer and supplies the data to the control unit 11. For example, print data of images generated using various application programs installed in the host computer is supplied to the control unit 11 via the interface 13.

The magnetic ink character reading unit 14 is provided for reading the magnetic ink characters printed on the sheet. Detailed operations of the magnetic ink character reading unit 14 will be described later. The control unit 11 recognizes a character string printed on the sheet using the magnetic ink characters based on the data supplied from the magnetic ink character reading unit 14. The character string recognized by the control unit 11 is supplied to the host computer via the interface 13 and is subjected to various processes in the host computer.

The print unit 15 is provided for printing images on the sheet. The control unit 11 analyzes the print data supplied from the host computer via the interface 13 and converts the print data into raster image data. The control unit 11 supplies the raster image data to the print unit 15 for printing.

In this way, the magnetic ink character reading apparatus 10 has a function of reading the character string recorded on the sheet using the magnetic ink characters and a function of printing images on the sheet. Such a magnetic ink character reading apparatus is used for clearing checks in a retail store or the like.

Here, the magnetic ink character reading unit 14 will be described in detail. FIG. 2 is a schematic diagram showing mechanisms of the magnetic ink character reading unit 14. As shown in FIGS. 1 and 2, the magnetic ink character reading unit 14 includes a sheet sensor 16 (sheet sensors 16a and 16b), a transport roller 17, a transport motor 18, a transport motor drive control section 19, a magnet 20, a magnetic head 21, a magnetic detection signal processing circuit section 22, and an A/D converter 23.

The sheet sensor 16a detects whether the sheet 24 is inserted into a predetermined insertion port of the magnetic ink character reading apparatus 10. The transport roller 17 transports the sheet 24 inserted into the insertion port at a constant speed. The transport of the sheet 24 by the transport roller 17 causes the sheet 24 to be moved relative to the magnetic head 21. The transport motor 18 includes a step motor for rotating the transport roller 17 at a constant speed. The transport motor drive control section 19 controls the driving of the transport motor 18. When the sheet sensor 16a detects that the sheet 24 is inserted into the insertion port, the control unit 11 instructs the transport motor drive control section 19 to drive the transport motor 18. When the transport motor 18 is driven, the transport roller 17 rotates in the direction (in the clockwise direction) indicated by the arrow A in FIG. 2; and the sheet 24 is transported in the direction indicated by the arrow B in FIG. 2. At this moment, the sheet 24 is pinched between the magnetic head 21 and the transport roller 17.

An area on the surface 24a of the sheet 24 having the magnetic ink characters printed thereon is magnetized by the magnet 20. The magnetic head 21 is an element that detects a variation in magnetic flux intensities. The magnetic head 21 outputs signals (magnetic detection signals) corresponding to the variation in the magnetic flux densities on the magnetic ink characters printed on the surface 24a of the sheet 24. The magnetic detection signals outputted from the magnetic head 21 are supplied to the magnetic detection signal processing circuit section 22.

Here, the magnetic detection signals outputted from the magnetic head 21 and the operations of the magnetic detection signal processing circuit section 22 will be described. FIGS. 3A to 3C are diagrams for explaining the magnetic detection signals outputted from the magnetic head 21 and the operations of the magnetic detection signal processing circuit section 22.

In the present embodiment, it is assumed that the magnetic ink characters to be read are based on JIS X9002 specification. In JIS X9002 specification, fourteen magnetic ink characters (Strokes 0 to 13) are prescribed. Strokes 0 to 9 correspond to numbers 0 to 9, respectively. Strokes 10 to 13 correspond to predetermined symbols, respectively. FIG. 3A shows an example of the magnetic ink characters based on JIS X9002 specification. In FIG. 3A, Strokes 0 and 8 are shown as an example. As shown in FIG. 3A, each magnetic ink character should be printed inside a rectangle consisting of 9×7 (vertical×horizontal) squares with a side length of 0.33 mm. In addition, JIS X9002 prescribes that a pitch of one character of the magnetic ink characters (i.e., a distance between the starts of adjacent characters) is 3.175 mm.

FIG. 3B shows the magnetic detection signals outputted from the magnetic head 21 at the time of reading the magnetic ink characters shown in FIG. 3A. As shown in FIG. 3B, a positive-polarity pulse is outputted from the magnetic head 21 at time points A, C, E, F, and H in which at least a portion of a target detection area of the magnetic head 21 is moved from a non-printed area of the sheet 24 not having the magnetic ink characters printed thereon to a printed area having the magnetic ink characters printed thereon, i.e., at time points in which the magnetic flux density increases. Meanwhile, a negative-polarity pulse is outputted from the magnetic head 21 at time points B, D, G, I, and J in which at least a portion of a target detection area of the magnetic head 21 is moved from the printed area of the sheet 24 having the magnetic ink characters printed thereon to the non-printed area not having the magnetic ink characters printed thereon, i.e., at time points in which the magnetic flux density decreases.

Figures 4, 5:
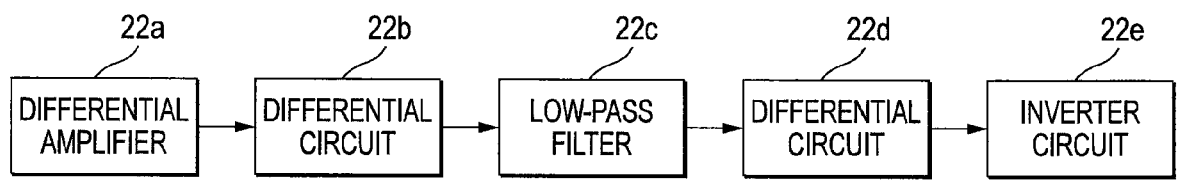
FIG. 4 is a diagram showing functional blocks of a magnetic detection signal processing circuit section.
FIG. 5 is a diagram showing an example of magnetic detection signal data.

The magnetic detection signal processing circuit section 22 amplifies and filters the magnetic detection signals inputted from the magnetic head 21. FIG. 4 is a diagram showing functional blocks of the magnetic detection signal processing circuit section 22. As shown in FIG. 4, the magnetic detection signal processing circuit section 22 includes a differential amplifier 22a, a differential circuit 22b, a low-pass filter 22c, a differential circuit 22d, and an inverter circuit 22e.

The magnetic detection signals inputted from the magnetic head 21 are amplified by being DC-biased (DC-level-shifted) by the differential amplifier 22a. In the present embodiment, the magnetic detection signals inputted from the magnetic head 21 are DC-biased by 2.5 V by the differential amplifier 22a. The magnetic detection signals amplified by the differential amplifier 22a are then processed by the differential circuit 22b to emphasize peaks thereof, and noise components thereof are removed by the low-pass filter 22c. The magnetic detection signals having the noise components removed by the low-pass filter 22c is inputted to the A/D converter 23 after passing through the differential circuit 22d and the inverter circuit 22e.

FIG. 3C shows signals outputted from the magnetic detection signal processing circuit section 22 when the magnetic detection signals shown in FIG. 3B are inputted from the magnetic head 21. As shown in FIG. 3C, the signals outputted from the magnetic detection signal processing circuit section 22 are those obtained by DC-biasing the magnetic detection signals inputted from the magnetic head 21.

The A/D converter 23 performs A/D conversion to the signals inputted from the magnetic detection signal processing circuit section 22 in accordance with interrupt signals generated by a timer circuit (not shown). In recognition of magnetic ink characters, it is important to accurately specify the peak points of the magnetic detection signals. To this end, in order to accurately specify the peak points of the magnetic detection signals in the recognition process of the magnetic ink characters, in this example, the magnetic detection signals are sampled at a sampling frequency about ten times the minimum peak distance (i.e., a minimum distance between two adjacent peaks) of the magnetic detection signals. In addition, the magnetic detection signals are quantized with a quantization bit number of 10, for example. More specifically, a voltage of 0 to 5 V is quantized into 1024-level values. The A/D converted signals (hereinafter, referred to as "magnetic detection signal data") are supplied to the control unit 11 and are then stored in the storage unit 12 in a sequential manner. FIG. 5 shows an example of the magnetic detection signal data stored in the storage unit 12.

The above-described operations of the magnetic ink character reading apparatus 14 are repeated until the sheet 24 is not detected by the sheet sensor 16$b$ disposed on the downstream side of the magnetic head 21, or until predetermined pages of the sheet 24 are transported by the transport roller 17.

Next, a process of recognizing the magnetic ink characters printed on the sheet 24 based on the magnetic detection signal data stored in the storage unit 12 will be described. FIGS. 6 to 9 are flowcharts showing the recognition process. FIG. 10 is a diagram for explaining the recognition process. The recognition process is performed by the execution of the program stored in the storage unit 12 when instructed by the control unit 11.

Figure 6:
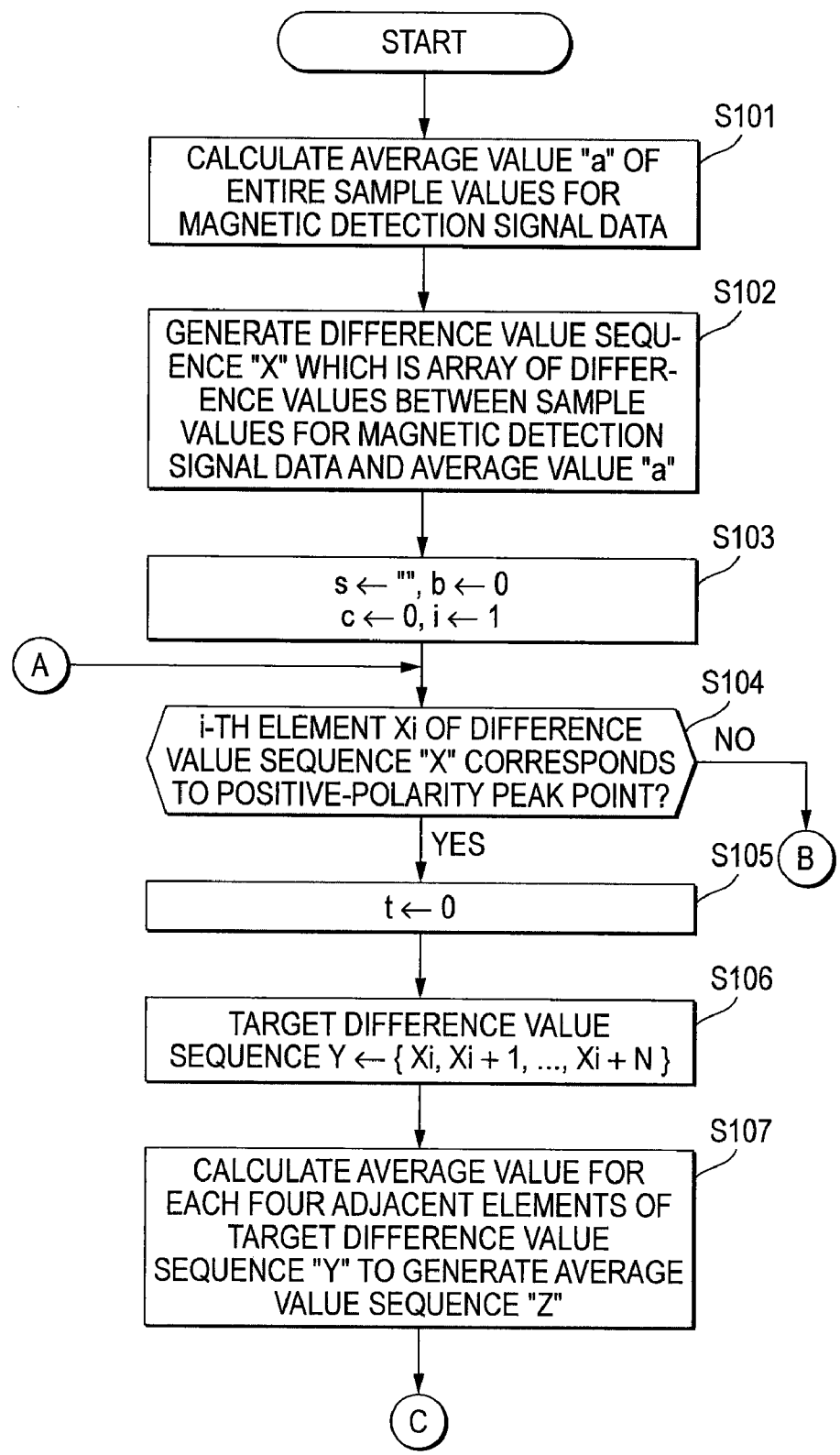
FIG. 6 is a flowchart showing processes performed by the magnetic ink character reading apparatus.
Figure 7:
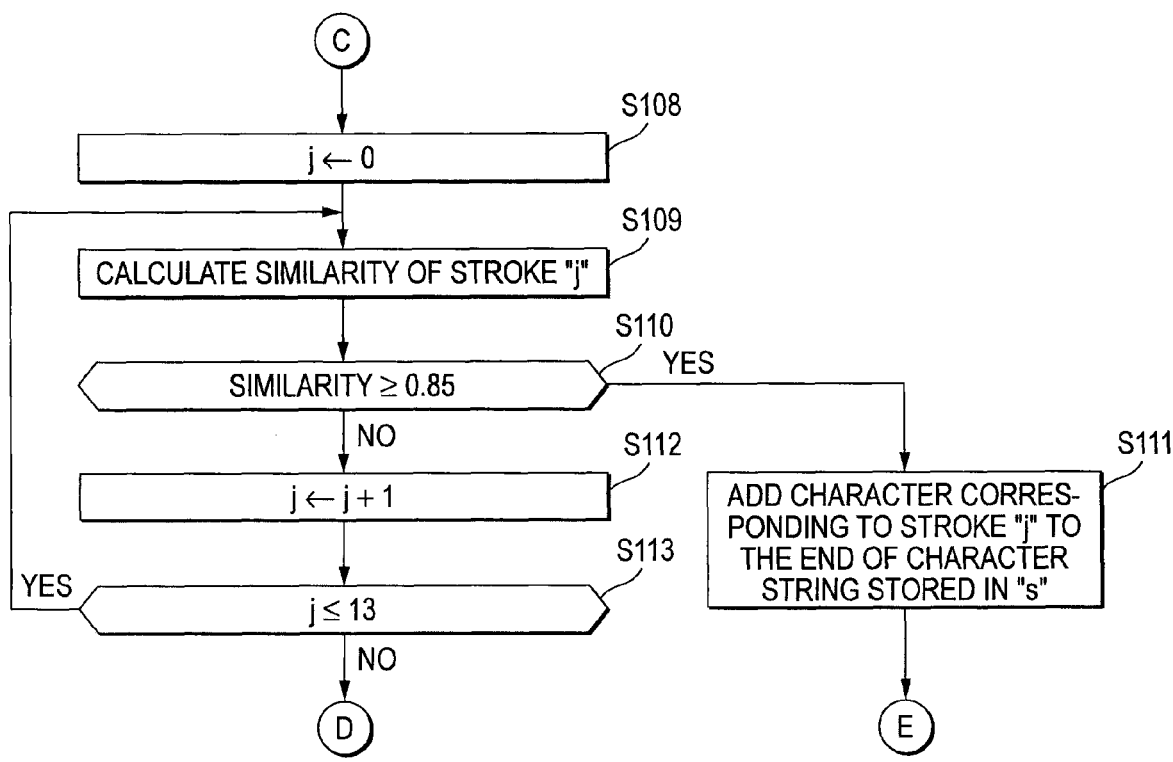
FIG. 7 is a flowchart showing processes performed by the magnetic ink character reading apparatus.

As shown in FIG. 6, first, the magnetic ink character reading apparatus 10 calculates an average value "a" of the entire sample values for the magnetic detection signal data (S101). Then, the magnetic ink character reading apparatus 10 generates a difference value sequence X which is an array of difference values between the sample values for the magnetic detection signal data and the average value "a" (S102: see (1) in FIG. 10).

The magnetic ink character reading apparatus 10 initializes various variables (S103). For example, the magnetic ink character reading apparatus 10 initializes a character string type variable "s" to a blank character string (character string having a length of 0). The character string type variable "s" is used for storing the recognition result of the magnetic ink character string printed on the sheet 24. Moreover, the magnetic ink character reading apparatus 10 initializes a variable "b" to 0, for example. The variable "b" is incremented by one when it is detected that the number of adjacent elements in the difference value sequence X not corresponding to the positive-polarity peak points (time points A, C, E, F, and H in FIG. 3B) is not smaller than a predetermined number. That is, the variable "b" is used to count the number of detections that the number of adjacent elements in the difference value sequence X not corresponding to the positive-polarity peak points is not smaller than a predetermined number. Moreover, the magnetic ink character reading apparatus 10 initializes a variable "c" to 0, for example. The variable "c" is used to count the number of recognized magnetic ink characters. In addition, the magnetic ink character reading apparatus 10 initializes a variable "i" to 1.

Next, the magnetic ink character reading apparatus 10 determines whether Element $Xi$ which is the i-th element in the difference value sequence X corresponds to one of the positive-polarity peak points (S104). For example, the magnetic ink character reading apparatus 10 determines whether the value of Element $Xi$ is not smaller than the value of Element $Xi-1$ which is the (i−1)-th element in the difference value sequence X and is not greater than Element $Xi+1$ which is the (i+1)-th element in the difference value sequence X. When the value of Element $Xi$ is not smaller than the value of Element $Xi-1$ and is not greater than the value of Element $Xi+1$, the magnetic ink character reading apparatus 10 determines that Element $Xi$ corresponds to one of the positive-polarity peak points.

If Element $Xi$ corresponds to one of the positive-polarity peak points, the magnetic ink character reading apparatus 10 initializes a variable "t" to 0 (S105). The variable "t" is used to count the number of adjacent elements not corresponding to the positive-polarity peak points.

Next, the magnetic ink character reading apparatus 10 performs a process of recognizing the magnetic ink character string printed on the sheet 24.

First, the magnetic ink character reading apparatus 10 acquires Elements $Xi, Xi+1, Xi+2, \ldots, Xi+N$ in the difference value sequence X as a target difference value sequence Y (S106: see (2) in FIG. 10). The target difference value sequence Y is a difference value sequence corresponding to one character. The value of a constant N is set to the number of elements (the number of samples) corresponding to one character. That is, the constant N is set to the number of elements corresponding to the time required for transporting the sheet 24 for a distance corresponding to the pitch of the magnetic ink characters described above. The time required for transporting the sheet 24 for the distance corresponding to the pitch of the magnetic ink characters is calculated based on the transport speed of the sheet 24 and the pitch of the magnetic ink characters. Moreover, the number of elements corresponding to the time is calculated based on the time and the sampling frequency described above.

Next, the magnetic ink character reading apparatus 10 calculates an average value for each four adjacent elements of the target difference value sequence Y to generate an average value sequence Z (S107: see (3) in FIG. 10).

The magnetic ink character reading apparatus 10 specifies the magnetic ink character corresponding to the target difference value sequence Y based on the average value sequence Z.

First, the magnetic ink character reading apparatus 10 initializes a variable "j" to 0 (S108). Then, the magnetic ink character reading apparatus 10 calculates a similarity of Stroke j (S109).

Figures 11, 12, 13:
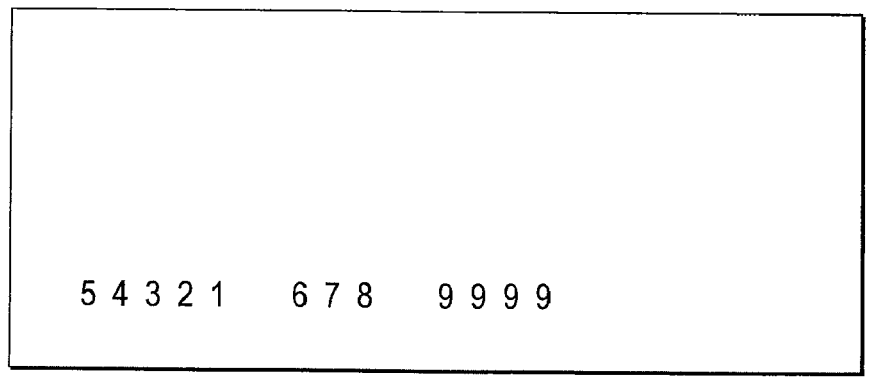
FIG. 11 shows an example of a reference value sequence table.
FIG. 12 shows an example of a reference character number table.
FIG. 13 shows an example of a sheet on which a character string is printed using magnetic ink characters.

A reference value sequence table as shown in FIG. 11 is pre-stored in the storage unit 12. As shown in FIG. 11, the reference value sequence table is a table in which the reference value sequence P is correlated with the magnetic ink characters. Here, "reference value sequence" is the magnetic detection signal data obtained by performing the same process (such as DC-biasing) as that of the magnetic detection signal processing circuit section 22 to original magnetic detection signals of the magnetic ink characters (i.e., the magnetic detection signals outputted from the magnetic head 21 at the time of reading the magnetic ink characters) and then performing the same A/D conversion process as that of the A/D converter 23 to the processed magnetic detection signals.

First, in S109, the magnetic ink character reading apparatus 10 reads the reference value sequence P corresponding to Stroke j. Next, the magnetic ink character reading apparatus 10 performs the same processes as those of S101 and S102 to the reference value sequence P for Stroke j to generate a reference difference value sequence Q for Stroke j (see (4) in FIG. 10). Moreover, the magnetic ink character reading apparatus 10 performs the same process as that of S107 to the reference difference value sequence Q for Stroke j to generate a reference average value sequence R (see (5) in FIG. 10). Then, the magnetic ink character reading apparatus 10 calculates a similarity between the average value sequence Z and the reference average value sequence R (see (6) in FIG. 10). The similarity is calculated using Expression 1. The similarity has a value in the range of −1 to 1; the greater the value, the more similar the two sequences Z and R are.

$$\text{Similarity} = \frac{\sum_{i=1}^{m}(Zi \times Ri)}{\sqrt{\sum_{i=1}^{m} Zi^2} \times \sqrt{\sum_{i=1}^{m} Ri^2}} \qquad \text{Expression 1}$$

The similarity calculated in S109 is stored as the similarity of Stroke j in the storage unit 12.

Next, the magnetic ink character reading apparatus 10 determines whether the similarity calculated in S109 is not smaller than 0.85 (S310). If the similarity is not smaller than 0.85, the magnetic ink character reading apparatus 10 determines that the target difference value sequence Y is indicative of the magnetic detection result for Stroke j. In this case, the magnetic ink character reading apparatus 10 adds a character corresponding to Stroke j to the end of the character string stored in the character string type variable "s" (S111). For example, when the value of the variable "j" is 0, the character corresponding to Stroke 0, i.e., "0" is added to the end of the character string stored in the character string type variable "s." Meanwhile, when the value of the variable "j" is 10, the character corresponding to Stroke 10, i.e., "A" is added to the end of the character string stored in the character string type variable "s."

In this way, in the course of calculating the similarity of each of Strokes 0 to 13 in a sequential manner, if there is a magnetic ink character having an extremely high similarity, the magnetic ink character reading apparatus 10 determines that the target differential value sequence Y is indicative of the magnetic detection result for the magnetic ink character; and the similarity of the remaining magnetic ink characters (of which the similarity is not calculated at that moment) is not calculated. Accordingly, the magnetic ink character reading apparatus 10 can reduce its processing load.

Meanwhile, if the similarity is smaller than 0.85, the magnetic ink character reading apparatus 10 increments the variable "j" by 1 (S112), and determines whether the variable "j" is not greater than 13 (S113). If the variable "j" is not greater than 13, the magnetic ink character reading apparatus 10 performs the process of S109 and subsequent processes. In this way, the similarity of each of Strokes 0 to 13 is calculated and is stored in the storage unit 12.

When it is determined in S113 that the value of the variable "j" is greater than 13, that is, when the similarities of the entire Strokes 0 to 13 are calculate, the magnetic ink character reading apparatus 10 determines whether a maximum of the similarities of Strokes 0 to 13 is not smaller than 0.5 (S114).

If the maximum of the similarities of Strokes 0 to 13 is smaller than 0.5, the magnetic ink character reading apparatus 10 performs a read error process (S115), and stops the main process. In this case, for example, a process of displaying a message on a liquid crystal display unit of the magnetic ink character reading apparatus may be performed to inform occurrence of the read error; or a process of transmitting data to a host computer so as to display a message on a display unit of the host computer may be performed to inform the occurrence of the read error.

When the maximum of the similarities of Strokes 0 to 13 is a relatively small value, the target difference value sequence Y may possibly not be the one indicative of the magnetic detection result of the magnetic ink character having the highest similarity. In this case, such a determination that the target difference value sequence Y is indicative of the magnetic detection result of the magnetic ink character having the highest similarity may lead to misrecognition. In this regard, the magnetic ink character reading apparatus 10 obviates such misrecognition by performing the processes of S114 and S115.

Meanwhile, if the maximum of the similarities of Strokes 0 to 13 is not smaller than 0.5, the magnetic ink character reading apparatus 10 determines whether the maximum of the similarities of Strokes 0 to 13 is not smaller than 0.6. If the maximum of the similarities of Strokes 0 to 13 is smaller than 0.6, the magnetic ink character reading apparatus 10 performs the read error process (S117). In this case, a process (retry process) is performed to re-read the magnetic ink characters. For example, the magnetic ink character reading apparatus 10 rotates the transport roller 17 in a reverse direction so as to move the sheet 24 back to the initial position (insertion port). Thereafter, the magnetic ink character reading apparatus 10 rotates the transport roller 17 in a forward direction so as to re-acquire the magnetic detection signal data (see FIG. 5). When the magnetic detection signal data is reacquired, the magnetic ink character reading apparatus 10 performs the main process from the beginning based on the reacquired magnetic detection signal data.

If the maximum of the similarities of Strokes 0 to 13 cannot be said to be a relatively small value nor a relatively high value, this may be caused by improper detection of the variation in the magnetic flux intensities on the magnetic ink characters printed on the sheet 24 due to a temporary problem. In this regard, in such cases, the magnetic ink character reading apparatus 10 automatically re-acquires the magnetic detection signal data and performs the main process from the beginning based on the reacquired magnetic detection signal data. In this way, the magnetic ink character reading apparatus 10 improves the recognition precision by performing the processes of S116 and S117. In addition, the magnetic ink character reading apparatus 10 obviates any increase in the users' burden related to the re-reading of the magnetic ink characters.

Meanwhile, if the maximum of the similarities of Strokes 0 to 13 is not smaller than 0.6, the magnetic ink character reading apparatus 10 determines whether the difference between the highest similarity and the second highest similarity among the similarities of Strokes 0 to 13 is not smaller than 0.3 (S118). If the difference between the highest similarity and the second highest similarity among the similarities of Strokes 0 to 13 is smaller than 0.3, the magnetic ink character reading apparatus 10 performs the read error process (S117). That is, in this case, the magnetic detection signal data is automatically re-acquired; and the main process is performed from the beginning based on the reacquired magnetic detection signal data.

When the difference between the highest similarity and the second highest similarity among the similarities of Strokes 0 to 13 is relatively small, the target difference value sequence Y may possibly be the one indicative of the magnetic detection result of the magnetic ink character having the second highest similarity rather than the highest similarity. In this case, such a determination that the target difference value sequence Y is indicative of the magnetic detection result of the magnetic ink character having the highest similarity may lead to misrecognition. In this regard, the magnetic ink character reading apparatus 10 obviates such misrecognition by performing the processes of S118 and S117.

Meanwhile, if the difference between the highest similarity and the second highest similarity among the similarities of Strokes 0 to 13 is not smaller than 0.3, the magnetic ink character reading apparatus 10 determines that the target difference value sequence Y is indicative of the magnetic detection result of the magnetic ink character having the highest similarity among the similarities of Strokes 0 to 13, and adds a character corresponding to the magnetic ink character to the end of the character string stored in the character string type variable "s" (S119). For example, when the similarity of Stroke 0 is the highest, the character corresponding to Stroke 0, i.e., "0" is added to the end of the character string stored in the character string type variable "s."

In S111 or S119, when the magnetic ink character corresponding to the target difference value sequence Y is specified; and a character corresponding to the magnetic ink character is added to the end of the character string stored in the character string type variable "s", the magnetic ink character reading apparatus 10 increments the variable "c" by 1 (S120). Then, the magnetic ink character reading apparatus 10 determines whether Element $X_{i+N}$ is the last element in the difference value sequence X (S121). If Element $X_{i+N}$ is the last element in the difference value sequence X, the magnetic ink character reading apparatus 10 terminates the main process. Meanwhile, if Element $X_{i+N}$ is not the last element in the difference value sequence X, the magnetic ink character reading apparatus 10 increments the variable "i" by (N+1) (S122) and performs the process of S104 and subsequent processes.

Next, a process will be described which is performed when it is determined in S104 that Element $X_i$ does not correspond to one of the positive-polarity peak points.

When it is determined that Element $X_i$ does not correspond to one of the positive-polarity peak points, the magnetic ink character reading apparatus 10 increments the variable "t" by 1 (S123). Then, the magnetic ink character reading apparatus 10 determines whether the value of the variable "c" is greater than 0 and the value of the variable "t" is equal to a constant T (S124). The constant T is set to the number of elements (the number of samples) corresponding to one character, for example. That is, the constant T is set to the number of elements corresponding to the time required for transporting the sheet 24 for a distance corresponding to the pitch of the magnetic ink characters described above. In this case, the time required for transporting the sheet 24 for the distance corresponding to the pitch of the magnetic ink characters is calculated based on the transport speed of the sheet 24 and the pitch of the magnetic ink characters. Moreover, the number of elements corresponding to the time is calculated based on the time and the sampling frequency described above. By setting the constant T in such a manner, it is possible to determine in S124 whether a non-detected state in which an increase in the magnetic flux intensities is not detected lasts longer than a transport period of the sheet 24 corresponding to the pitch of the magnetic ink characters. In other words, detection is made for the presence of a space corresponding to a length of more than one magnetic ink characters. In this example, to take out of consideration the space between the left end of the sheet 24 and the start of the first magnetic ink character, it is detected in S124 whether the value of the variable "c" is greater than 0.

When the value of the variable "c" is greater than 0; and the value of the variable "t" is equal to the constant T, the magnetic ink character reading apparatus 10 increments the variable "b" by 1 (S125). Then, the magnetic ink character reading apparatus 10 reads a reference character number C corresponding to the value of the variable "b" from a reference character number table (S126).

Here, the reference character number table will be described. FIG. 12 shows an example of the reference character number table. As shown in FIG. 12, the reference character number table includes a "Number" field and a "Reference Character Number" field, in which the number of detections that the number of adjacent elements in the difference value sequence X not corresponding to the positive-polarity peak points is not smaller than a predetermined number is correlated with the number of characters (reference character number) which has to be recognized at that moment. The reference character number table is created to conform to a format of the magnetic ink character string printed on the sheet 24. FIG. 12 shows the reference character number table used at the time of reading the magnetic ink character string having a format shown in FIG. 13. That is, FIG. 12 shows the reference character number table used at the time of reading the magnetic ink character string which is composed of twelve magnetic ink characters, wherein the space corresponding to a length of more than one magnetic ink characters is disposed between the fifth and sixth characters and between the eighth and ninth characters, respectively. That is, the reference character number table shown in FIG. 12 states that at the time of the first detection that the number of adjacent elements in the difference value sequence X not corresponding to the positive-polarity peak points is not smaller than the predetermined number, the recognition has to be completed for five characters (in the example shown in FIG. 13, five characters of 5, 4, 3, 2, 1). Moreover, the reference character number table shown in FIG. 12 states that at the time of the second detection, the recognition has to be completed for eight characters (in the example shown in FIG. 13, five characters of 5, 4, 3, 2, 1, 6, 7, 8). Moreover, the reference character number table shown in FIG. 12 states that at the time of the third detection, the recognition has to be completed for twelve characters (in the example shown in FIG. 13, five characters of 5, 4, 3, 2, 1, 6, 7, 8, 9, 9, 9, 9). In addition, as described above, the space between the left end of the sheet 24 and the start of the first magnetic ink character is taken out of consideration.

In S126, the magnetic ink character reading apparatus 10 reads, as the reference character number C, the value in the "Reference Character Number" field of a record of which the value in the "Number" field is equal to the value of the variable "b."

Next, the magnetic ink character reading apparatus 10 determines whether the value of the variable "c" is equal to the reference character number C (S127). If the value of the variable "c" is not equal to the reference character number C, the magnetic ink character reading apparatus 10 performs the read error process (S128) and stops the main process. In this case, the read error process is the same as the read error process performed in S115.

Figure 14:
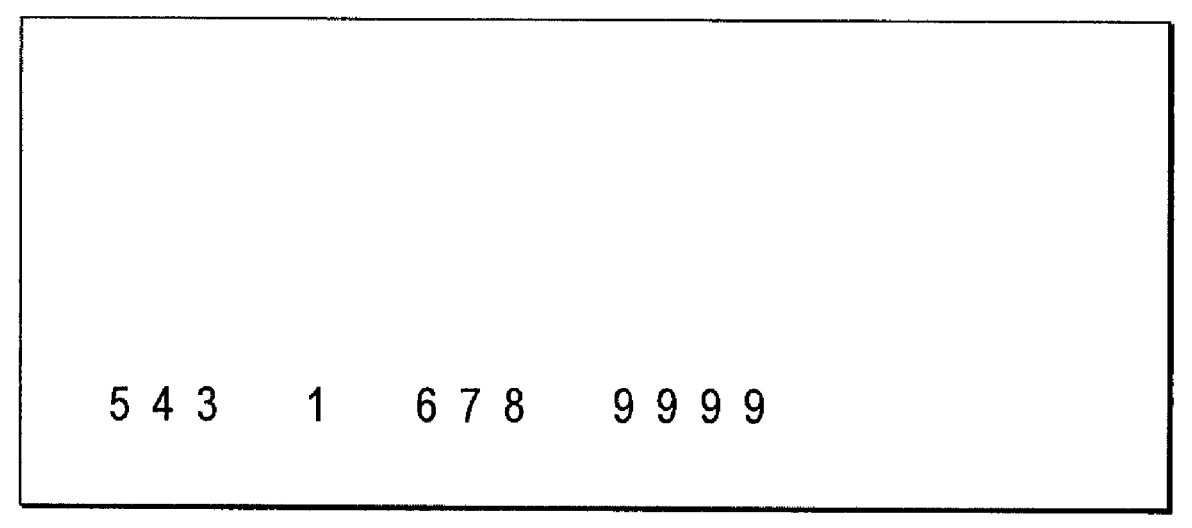

In this way, whenever it is detected that the number of adjacent elements in the difference value sequence X not corresponding to the positive-polarity peak points is not smaller than the predetermined number, the magnetic ink character reading apparatus 10 validates the number of recognition-completed characters at that moment based on the format of the magnetic ink characters printed on the sheet 24. When the number of recognition-completed characters is valid, the character recognition process is continued. Meanwhile, when the number of recognition-completed characters is not valid, the character recognition process is stopped. Accordingly, in the case in which a portion of the magnetic ink character string is not printed or unclearly printed as shown in FIG. 14, the magnetic ink character reading apparatus 10 can detect nonconformity between the recognition result and a predetermined format in a relatively early stage, thereby preventing an unnecessary character recognition process.

If the value of the variable "c" is 0 (N in S124); the value of the variable "t" is not equal to the constant T (N in S124); or the value of the variable "c" is equal to the reference character number C (Y in S127), the magnetic ink character reading apparatus 10 determines whether Element Xi is the last element in the difference value sequence X (S129). If the Element Xi is the last element in the difference value sequence X, the magnetic ink character reading apparatus terminates the main process. Meanwhile, if the Element Xi is not the last element in the difference value sequence X, the magnetic ink character reading apparatus 10 increments the variable "i" by 1 (S130)) and performs the process of S104 and subsequent processes.

Figure 15:
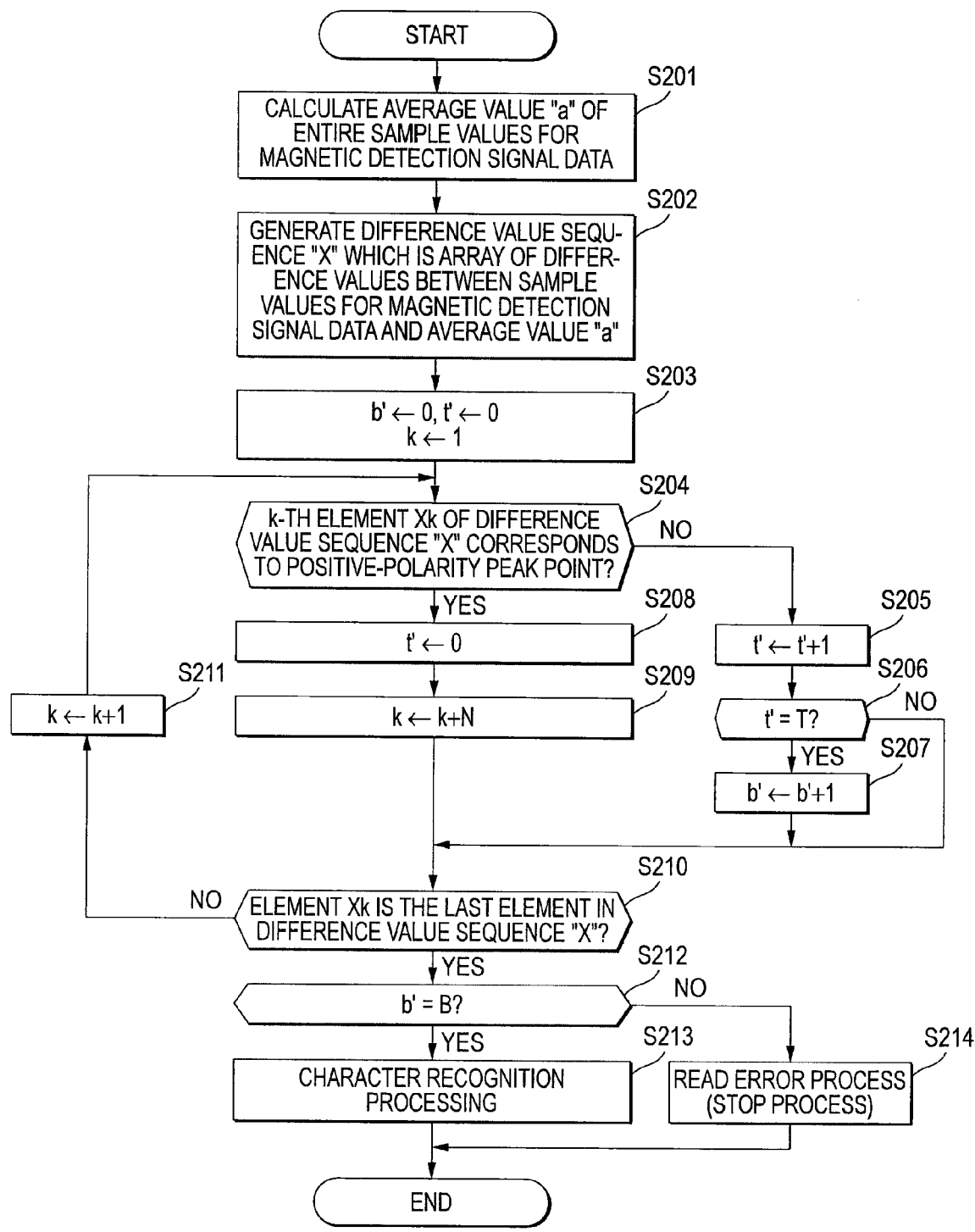
FIG. 15 is a flowchart showing processes performed by the magnetic ink character reading apparatus.

The magnetic ink character reading apparatus 10 may start the execution of the character recognition process after checking nonconformity between the magnetic ink character string of the recognition result and the predetermined format, wherein the nonconformity may be caused in the case in which a portion of the magnetic ink character string is not printed or unclearly printed. FIG. 15 is a flowchart showing the processes performed in such a case.

In this case, as shown in FIG. 15, the magnetic ink character reading apparatus 10 calculates an average value "a" of the entire sample values for the magnetic detection signal data (see FIG. 5) (S201). Then, the magnetic ink character reading apparatus 10 generates a difference value sequence X which is an array of difference values between the sample values for the magnetic detection signal data and the average value "a" (S202). These processes are performed in a manner similar to those of S101 and S102 in FIG. 6.

The magnetic ink character reading apparatus 10 initializes various variables (S203). For example, the magnetic ink character reading apparatus 10 initializes variables "b'" and "t'" to 0. The variable "b'" is the same as the variable "b" in FIGS. 6 to 9. The variable "t'" is the same as the variable "t" in FIGS. 6 to 9. In addition, the magnetic ink character reading apparatus 10 initializes a variable "k" to 1.

Next, the magnetic ink character reading apparatus 10 determines whether Element Xk which is the k-th element in the difference value sequence X corresponds to one of the positive-polarity peak points (S204). This determination is performed in a manner similar to that of S104 in FIG. 6.

If Element Xk does not correspond to one of the positive-polarity peak points, the magnetic ink character reading apparatus 10 increments the variable "t'" by 1 (S205). Then, the magnetic ink character reading apparatus 10 determines whether the value of the variable "t'" is equal to a constant T (S206). Here, the constant T is the same as the constant T in FIG. 9. When the value of the variable "t'" is equal to the constant T, the magnetic ink character reading apparatus 10 increments the variable "b'" by 1 (S207).

If Element Xk corresponds to one of the positive-polarity peak points, the magnetic ink character reading apparatus 10 initializes the variable "t'" to 0 (S208). Then, the magnetic ink character reading apparatus 10 increments the variable "k" by a constant N (S209). Here, the constant N is the same as the constant N in FIG. 6. In this case, Elements Xk to Xk+N in the difference value sequence X are read and discarded.

After performing the processes of S204 to S209, the magnetic ink character reading apparatus 10 determines whether Element Xk is the last element in the difference value sequence X (S210). If Element Xk is not the last element in the difference value sequence X, the magnetic ink character reading apparatus 10 increments the variable "k" by 1 (S211) and performs the process of S204 and subsequent processes.

Meanwhile, if Element Xk is the last element in the difference value sequence X, the magnetic ink character reading apparatus 10 determines whether the value of the variable "b'" is equal to a constant B (S212). The constant B is set to conform to the format of the magnetic ink character string printed on the sheet 24 and is stored in the storage unit 12. For example, in the case of reading the magnetic ink character string having a format shown in FIG. 13, the constant B is set to 4. In the magnetic ink character string shown in FIG. 13, there are four spaces: a) a space between the left end of the sheet 24 and the first magnetic ink character "5"; b) a space between the fifth magnetic ink character "1" and the sixth magnetic ink character "6"; c) a space between the eighth magnetic ink character "8" and the ninth magnetic ink character "9"; and d) a space between the twelfth magnetic ink character "9" and the right end of the sheet 24. Accordingly, in the case of reading the magnetic ink character string having a format shown in FIG. 13, there may be four detections that the number of adjacent elements in the difference value sequence X not corresponding to the positive-polarity peak points is not smaller than a predetermined number. In this example, the space between the left end of the sheet 24 and the first magnetic ink character is taken into consideration.

If the value of the variable "b'" is equal to the constant B, the magnetic ink character reading apparatus 10 performs the recognition process of the magnetic ink characters (S213) Here, the recognition process of the magnetic ink characters is the same as those shown in FIGS. 6 to 9. However, in this example, the processes of S101 and S102 in FIG. 6 or the processes of S123 to S128 in FIG. 9 may be omitted.

Meanwhile, if the value of the variable "b'" is not equal to the constant B, the magnetic ink character reading apparatus 10 performs the read error process (S214) and stops the main process. In this case, the read error process is the same as the read error process of S115 in FIG. 8.

In this way, in the case in which a portion of the magnetic ink character string is not printed or unclearly printed, the magnetic ink character reading apparatus 10 can detect nonconformity between the recognition result and a predetermined format in a relatively early stage, thereby preventing an unnecessary character recognition process.

Figure 8:
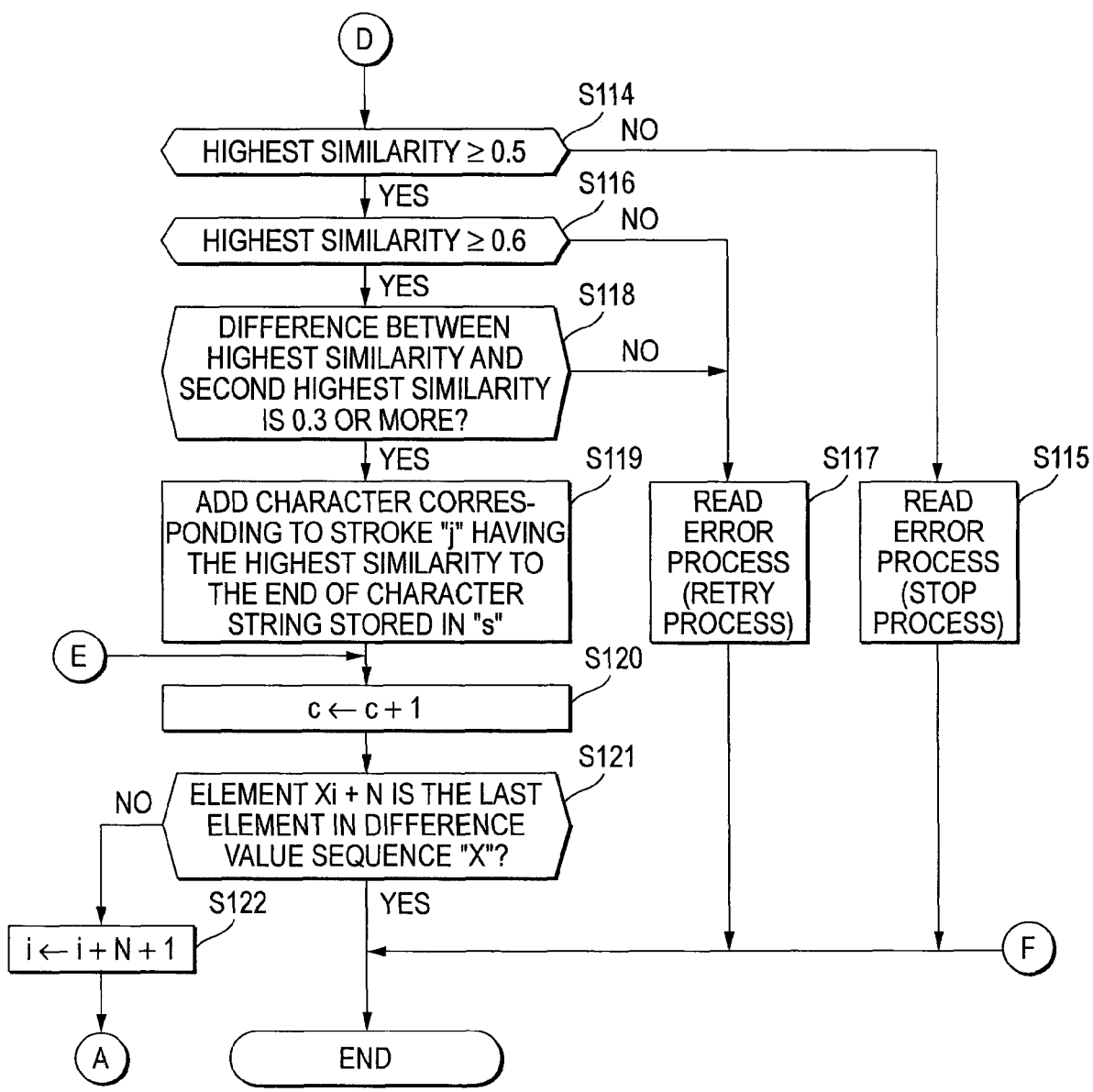
FIG. 8 is a flowchart showing processes performed by the magnetic ink character reading apparatus.
Figure 16:
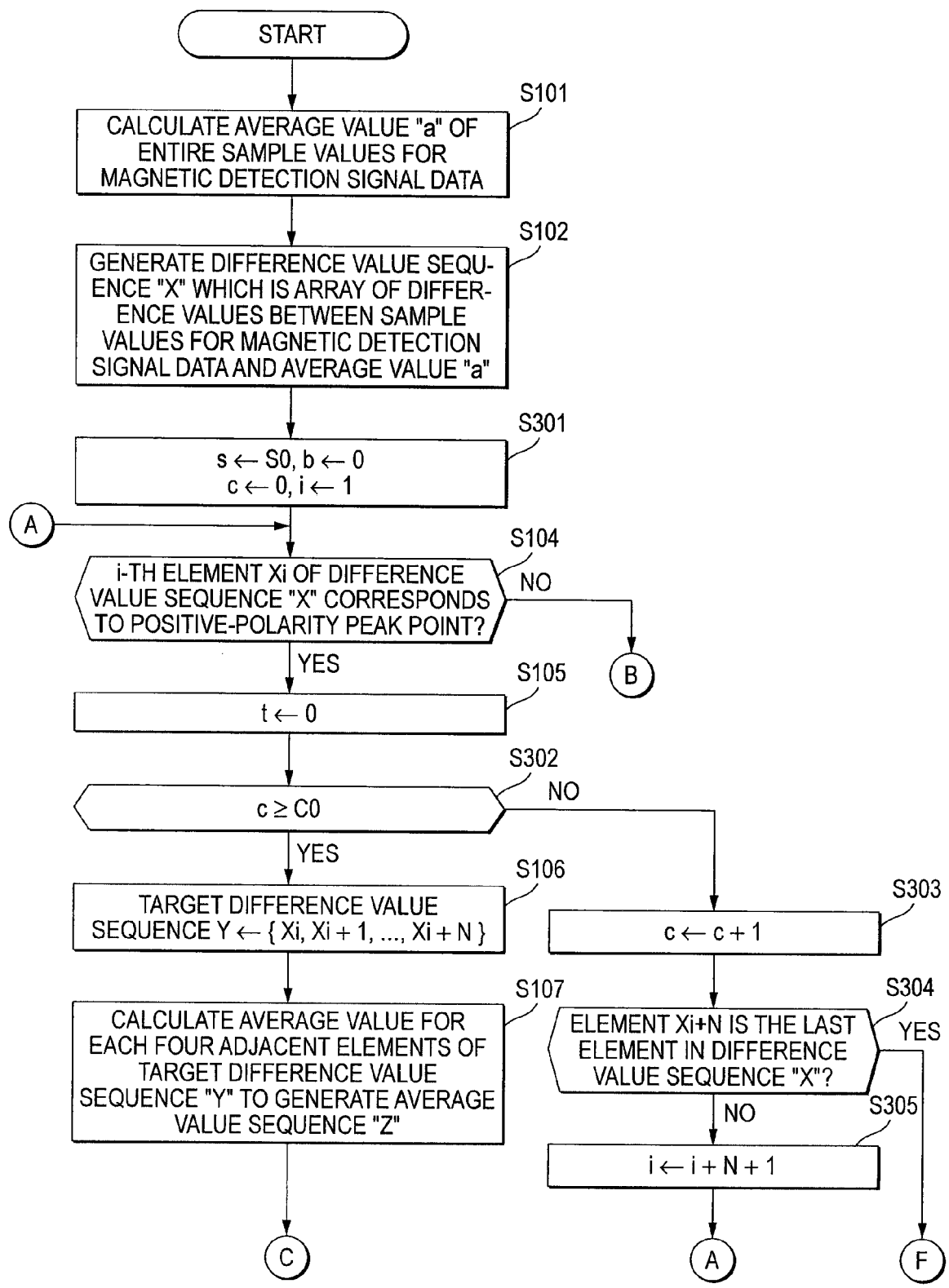
FIG. 16 is a flowchart showing processes performed by the magnetic ink character reading apparatus.

In the case in which the process of S117 in FIG. 8 is performed and the process of recognizing the magnetic ink characters based on the reacquired magnetic detection signal data, the following processes may be performed to reduce the processing loads. That is, in the read error process of S117 in FIG. 8, the value of the variable "c" at that moment may be stored in the storage unit 12 as a recognition-completed character number CO; and the character string stored in the character string type variable "s" at that moment may be stored in the storage unit as a recognition-completed character string S0. Moreover, the magnetic ink character reading apparatus 10 may perform the processes shown in FIG. 16 instead of those shown in FIG. 6 at the time of re-executing the recognition process of the magnetic ink characters based on the reacquired magnetic detection signal data. In FIG. 16, the same processes as those of FIG. 6 will be denoted by the same reference numeral.

The processes shown in FIG. 16 are different from those shown in FIG. 6 in that the process of S301 in the example shown in FIG. 16 is performed instead of the process of S103 in FIG. 6. The process of S301 is different from that of S103 in that the character string type variable "s" is initialized in S301 to the recognition-completed character string S0 that is stored in the storage unit 12.

The processes shown in FIG. 16 are also different from those shown in FIG. 6 in that: the process of S302 in the example shown in FIG. 16 is performed between the processes of S105 and S106; and the processes of S303 to S305 are further performed in the example shown in FIG. 16. Specifically, in the processes shown in FIG. 16, if Element $X_i$ corresponds to one of the positive-polarity peak points, the magnetic ink character reading apparatus 10 reads the recognition-completed character number C0 stored in the storage unit 12 and determines whether the value of the variable "c" is not smaller than the recognition-completed character number C0 (S302). If the value of the variable "c" is smaller than the recognition-completed character number C0, the magnetic ink character reading apparatus 10 increments the variable "c" by 1 (S303). Then, the magnetic ink character reading apparatus 10 determines whether Element $X_{i+N}$ is the last element in the difference value sequence X (S304). If Element $X_{i+N}$ is the last element in the difference value sequence X, the magnetic ink character reading apparatus 10 terminates the main process. Meanwhile, if Element $X_{i+N}$ is not the last element in the difference value sequence X, the magnetic ink character reading apparatus 10 increments the variable "i" by (N+1) (S305) and performs the process of S104 and subsequent processes. In this case, Elements $X_i$ to $X_{i+N}$ in the difference value sequence X are read and discarded; and the recognition processes of the magnetic ink characters corresponding to Elements $X_i$ to $X_{i+N}$ are omitted.

In this way, the magnetic ink character reading apparatus 10 may not perform the recognition process to the recognition-completed portions at the time of re-executing the recognition process of the magnetic ink characters based on the reacquired magnetic detection signal data. With such a configuration, it is possible to reduce the processing loads at the time of re-executing the recognition process of the magnetic ink characters based on the reacquired magnetic detection signal data.

Figure 17:
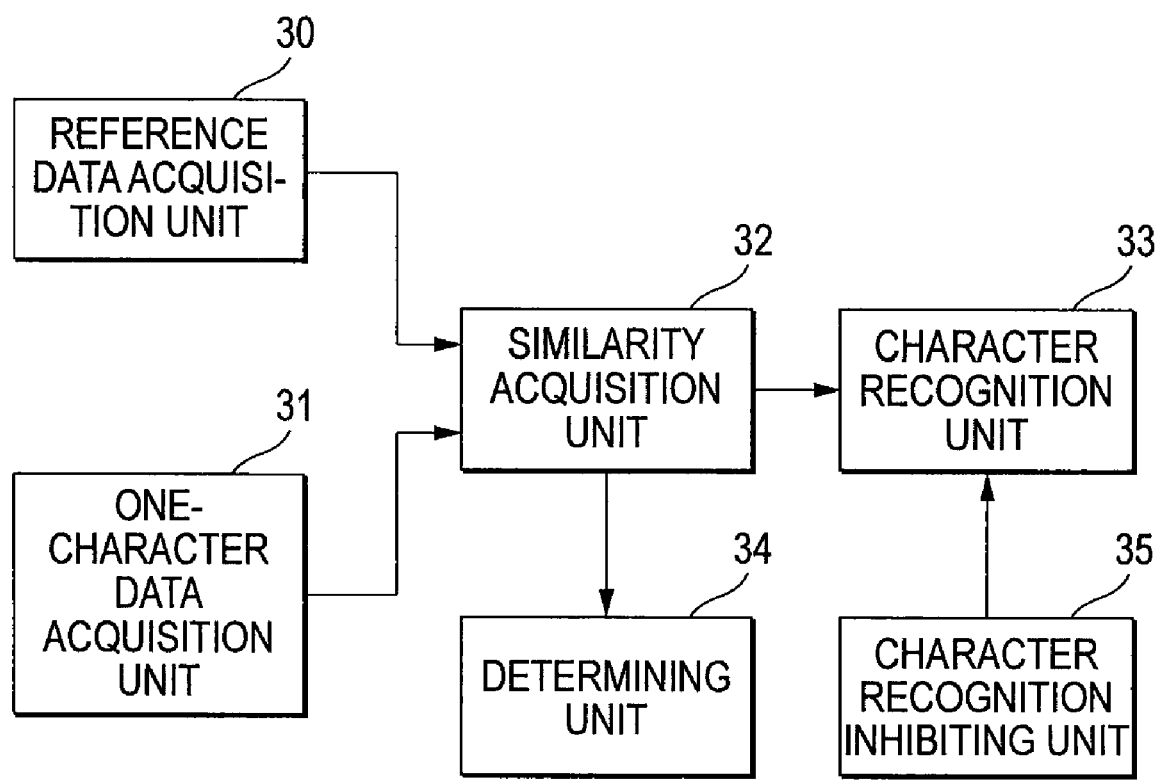
FIG. 17 is a diagram showing functional blocks of the magnetic ink character reading apparatus in accordance with the embodiment of the invention.

Hereinafter, functions that are realized by the magnetic ink character reading apparatus 10 will be described. FIG. 17 is a diagram showing functions that are realized by the magnetic ink character reading apparatus 10, in which only those particularly related to the invention are illustrated. As shown in FIG. 17, the magnetic ink character reading apparatus 10 includes functional blocks of a reference data acquisition unit 30, a one-character-corresponding data acquisition unit 31, a similarity acquisition unit 32, a character recognition unit 33, a determining unit 34, and a character recognition limiting unit 35. These functional blocks are realized by the control unit 11 executing a program that is read from the storage unit 12 for causing the magnetic ink character reading apparatus 10 to execute the processes as shown in FIGS. 6 to 9 and FIGS. 15 and 16.

Reference Data Acquisition Unit

The reference data acquisition unit 30 is mainly realized by the control unit 11 and the storage unit 12. The reference data acquisition unit 30 acquires the reference data corresponding to the magnetic ink characters (Strokes 0 to 13). For example, the reference data acquisition unit 30 reads the reference data corresponding to the magnetic ink characters from the storage unit 12. In the present embodiment, the reference value sequence P (see FIG. 11) for each of the magnetic ink characters corresponds to the "reference data." One-Character-Corresponding Data Acquisition Unit The one-character-corresponding data acquisition unit 31 is mainly realized by the control unit 11. The one-character-corresponding data acquisition unit 31 extracts the one-character-corresponding data from the detection result data that is indicative of the detection result of the magnetic head 21. In the present embodiment, the difference value X corresponds to the "detection result data"; and the target difference value sequence Y corresponds to the "one-character-corresponding data."

Similarity Acquisition Unit

The similarity acquisition unit 32 is mainly realized by the control unit 11. The similarity acquisition unit 32 acquires the similarity between the one-character-corresponding data and the reference data corresponding to the magnetic ink characters in a sequential manner, in which the acquisition process is performed for each of the magnetic ink characters (Strokes 0 to 13).

Character Recognition Unit

The character recognition unit 33 is mainly realized by the control unit 11. The character recognition unit 33 recognizes the magnetic ink character corresponding to the one-character-corresponding data acquired by the one-character-corresponding data acquisition unit 31 based on the similarity acquired by the similarity acquisition unit 32.

For example, the character recognition unit 33 (character recognition unit) determines that the magnetic ink character of which the similarity acquired by the similarity acquisition unit 32 is the highest among the plurality of magnetic ink characters (Strokes 0 to 13) is the magnetic ink character corresponding to the one-character-corresponding data.

For example, whenever the similarity is acquired by the similarity acquisition unit 32, the character recognition unit 33 (second similarity determining unit) determines whether the similarity is greater than a predetermined reference similarity (0.85 in the present embodiment). Moreover, when it is determined that the similarity of one of the plurality of magnetic ink characters is greater than the reference similarity, the character recognition unit 33 (second character recognition unit) determines that the one magnetic ink character is the magnetic ink character corresponding to the one-character-corresponding data. In this case, the similarity acquisition of the similarity acquisition unit 32 is limited.

Determining Unit

The determining unit 34 is mainly realized by the control unit 11. The determining unit 34 determines whether the similarity acquired by the similarity acquisition unit 32 satisfies a predetermined condition.

For example, the determining unit 34 (similarity difference determining unit) determines whether the difference between the highest similarity and the second highest similarity among the similarities acquired by the similarity acquisition unit 32 is smaller than a predetermined reference difference (0.3 in the present embodiment).

For example, the determining unit 34 (similarity determining unit) determines whether the highest similarity among the similarities acquired by the similarity acquisition unit 32 is smaller than a predetermined reference similarity (0.6 in the present embodiment).

Character Recognition Limiting Unit

The character recognition limiting unit 35 limits the recognition of the character recognition unit 33 based on the determination result of the determining unit 34.

For example, when the determining unit 34 determines that the difference between the highest similarity and the second highest similarity among the similarities acquired by the similarity acquisition unit 32 is smaller than the predetermined reference difference (0.3 in the present embodiment), the character recognition limiting unit 35 (character recognition limiting unit) limits (for example, prevents) the determination that the magnetic ink character among the plurality of magnetic ink characters having the highest similarity among the similarities acquired by the similarity acquisition unit 32 is the magnetic ink character corresponding to the one-character-corresponding data.

For example, when the determining unit 34 determines that the highest similarity among the similarities acquired by the similarity acquisition unit 32 is smaller than the predetermined reference similarity (0.6 in the present embodiment), the character recognition limiting unit 35 (second character recognition limiting unit) limits (for example, prevents) the determination that the magnetic ink character among the plurality of magnetic ink characters having the highest similarity among the similarities acquired by the similarity acquisition unit 32 is the magnetic ink character corresponding to the one-character-corresponding data.

When the recognition of the character recognition unit 33 is limited by the character recognition limiting unit 35, the magnetic ink character reading apparatus 10 may retry the reading of the magnetic ink characters printed on the sheet 24. That is, the magnetic ink character reading apparatus 10 may cause the magnetic head 21 to redetect the variation in magnetic flux intensities on the magnetic ink characters printed on the sheet 24. Thereafter, the magnetic ink character reading apparatus 10 may perform the character recognition process (FIGS. 6 to 9 and FIGS. 15 and 16) based on the redetection result data that is indicative of the redetection result of the magnetic head 21.

The magnetic ink character reading apparatus 10 may cause the storage unit 12 (recognition-completed character number information storage unit) to store information (recognition-completed character number information) for specifying the number of characters to be recognized by the character recognition unit 33 before the character recognition limiting unit 35 limits the recognition of the character recognition unit 33. Here, the recognition-completed character number information may be information (for example, C0 in FIG. 16) that is indicative of the number of characters itself recognized by the character recognition unit 33; or may be information (for example, S0 in FIG. 16) that is indicative of the character string recognized by the character recognition unit 33. Moreover, when the recognition of the character recognition unit 33 is limited by the character recognition limiting unit 35 and the character recognition process is performed based on the redetection result data, the magnetic ink character reading apparatus 10 may omit a portion of the character recognition process based on the number of characters specified by the recognition-completed character number information.

As described above, according to the magnetic ink character reading apparatus 10, it is possible to reduce misrecognition of the magnetic ink characters recorded on the sheet 24. Moreover, in the case in which a portion of the magnetic ink character string is not printed or unclearly printed, the magnetic ink character reading apparatus 10 can detect nonconformity between the recognition result and a predetermined format in a relatively early stage, thereby preventing an unnecessary character recognition process. Accordingly, the processing loads of the magnetic ink character reading apparatus 10 are reduced.

However, the invention is not limited to the embodiment described above.

For example, the print unit 15 is not the essential component of the invention.

For example, the magnetic ink characters printed on the sheet 24 may be based on a different format other than the JIS X9002.

Figure 9:
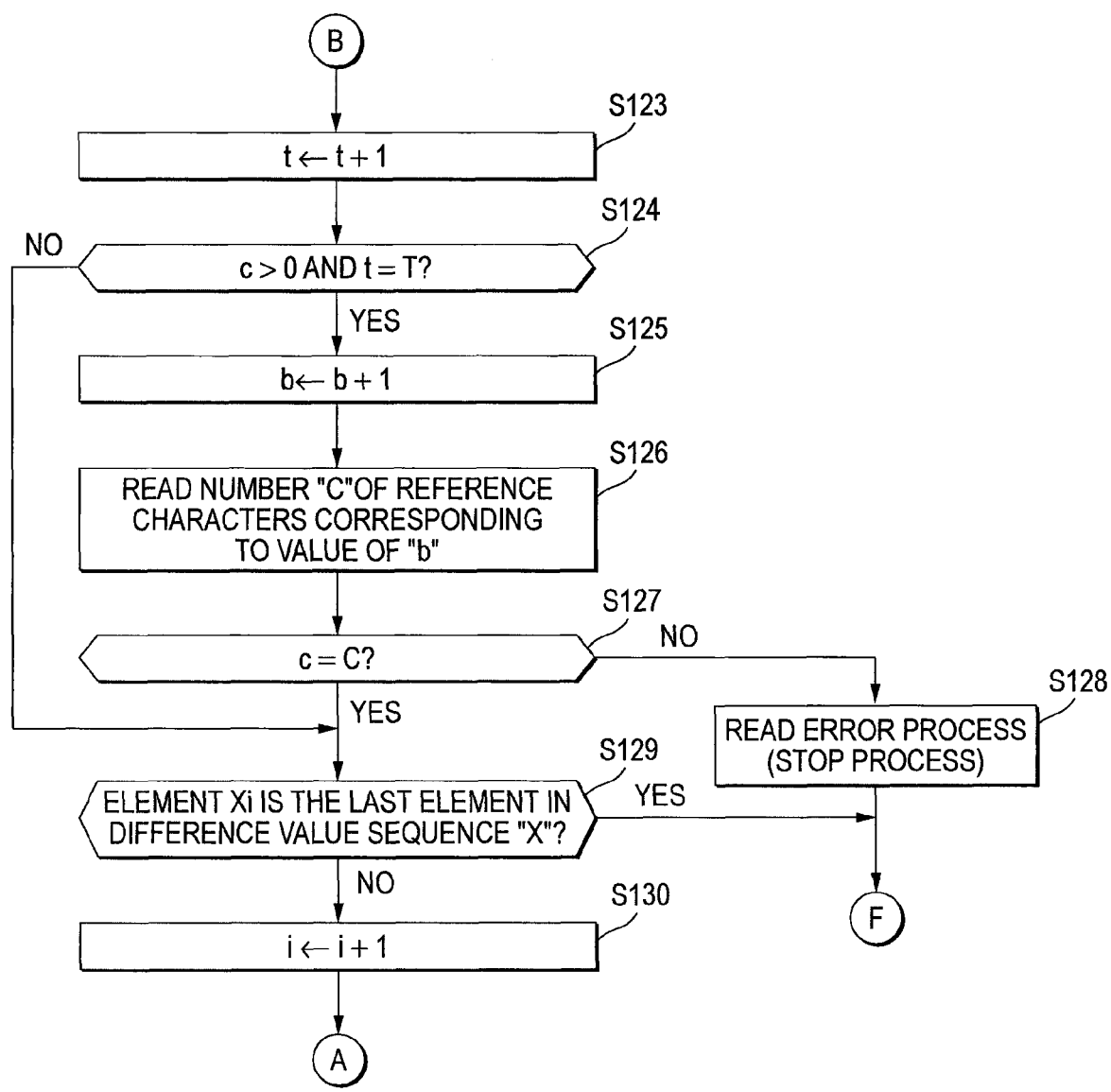
FIG. 9 is a flowchart showing processes performed by the magnetic ink character reading apparatus.
Figure 10:
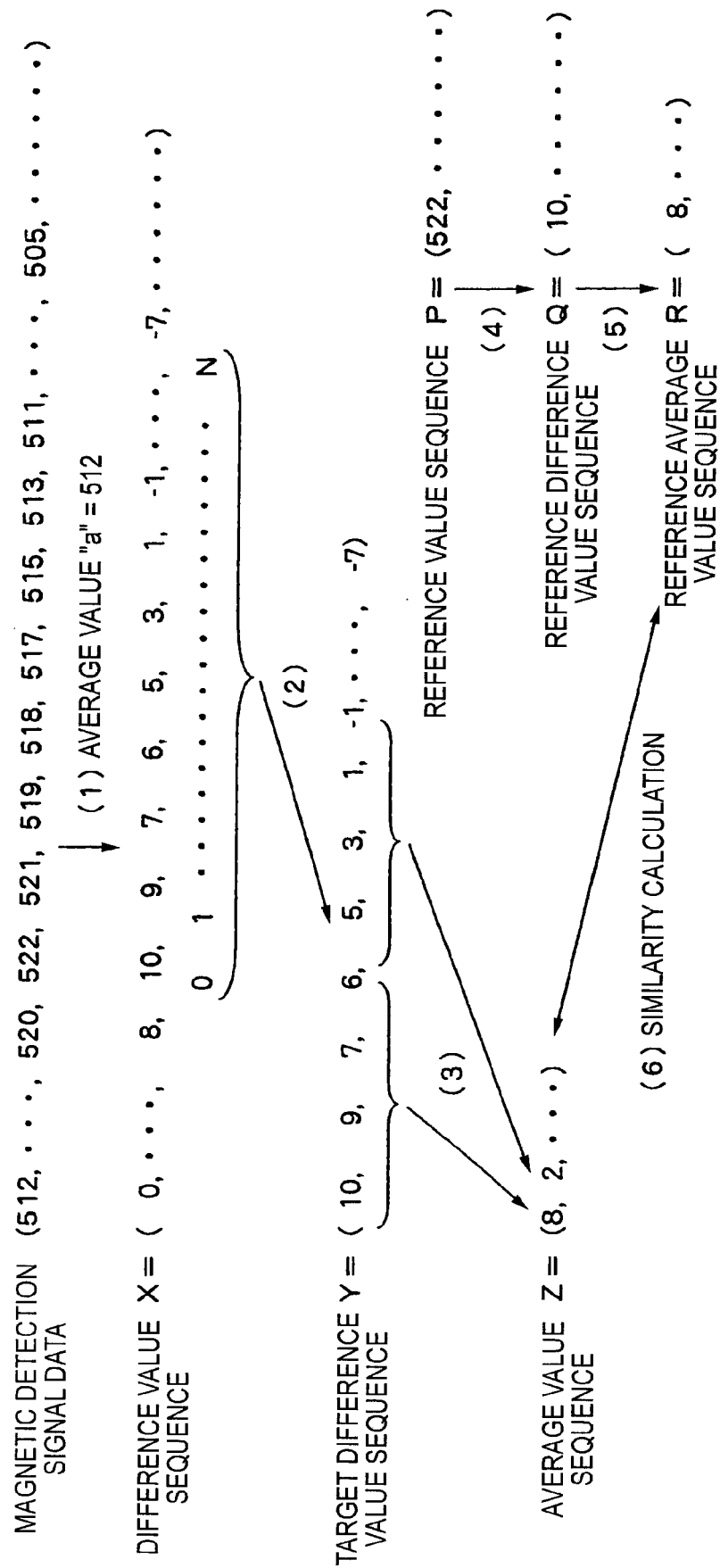
FIG. 10 is a diagram for explaining processes performed by the magnetic ink character reading apparatus.

For example, the process of S115 in FIG. 8, S128 in FIG. 9, or S214 in FIG. 15 may be configured to perform the same read error process (retry process) as that of S117 in FIG. 8.

For example, the process of S117 in FIG. 8 may be configured to perform the same read error process (stop process) as that of S115 in FIG. 8.

For example, the same read error process (stop process) as that of S115 in FIG. 8 may be performed even when it is not determined in S104 in FIG. 6 or FIG. 16 that Element Xi corresponds to one of the positive-polarity peak points, i.e., even when the positive-polarity peak points are not detected. In this case, the same read error process (retry process) as that of S117 in FIG. 8 is not performed. When the positive-polarity peak points are not detected, it is highly possible that the sheet 24 is incorrectly inserted upside down. Accordingly, the retry process may be useless if performed in such a situation. In this regard, it is possible to prevent such an unnecessary retry process and thus reduce the processing loads of the magnetic ink character reading apparatus 10.

For example, the same read error process as that of S115 or S117 in FIG. 8 may be performed based on the determination result on whether a predetermined symbol (for example, Strokes 10 to 13) is disposed at a predetermined position in the character string.

For example, the magnetic ink character reading apparatus 10 may repeat the retry process in several times. In this case, if the number of executions of the retry process reaches a predetermined number, the magnetic ink character reading apparatus 10 may limit the execution of the retry process and stop the reading of the magnetic ink characters.

What is claimed is:

1. A magnetic ink character reading apparatus including a magnetic head that detects a variation in magnetic flux intensities on magnetic ink characters, in which a character recognition process is performed based on detection result data indicative of the detection result of the magnetic head so as to recognize the magnetic ink characters recorded on a recording medium on a character-by-character basis, the apparatus comprising:

a reference data acquisition unit that acquires reference data corresponding to a plurality of magnetic ink characters, respectively;

a one-character-corresponding data acquisition unit that extracts data corresponding to one character from the detection result data;

a similarity acquisition unit that acquires a similarity between the one-character-corresponding data and reference data corresponding to the magnetic ink characters, the similarity acquisition being performed for each of the plurality of magnetic ink characters;

a character recognition unit that recognizes the magnetic ink character of which the similarity acquired by the similarity acquisition unit is the highest among the plurality of magnetic ink characters as the magnetic ink character corresponding to the one-character-corresponding data;

a similarity difference determining unit that determines whether a difference between the highest similarity and the second highest similarity among the similarities acquired by the similarity acquisition unit is smaller than a predetermined reference difference; and a character recognition limiting unit that limits the recognition of the character recognition unit based on the determination result of the similarity difference determining unit.

2. The magnetic ink character reading apparatus according to claim 1, further comprising:

a similarity determining unit that determines whether the highest similarity among the similarities acquired by the similarity acquisition unit is smaller than a predetermined reference similarity; and a second character recognition limiting unit that limits the recognition of the character recognition unit based on the determination result of the similarity determining unit.

3. The magnetic ink character reading apparatus according to claim 1, further comprising a recognition-completed character number information storage unit that stores recognition-completed character number information for specifying the number of recognition-completed characters, wherein:

when the recognition of the character recognition unit is limited, the apparatus causes the magnetic head to redetect the variation in the magnetic flux intensities on the magnetic ink characters recorded on the recording medium, and thereafter the character recognition process is performed based on redetection result data indicative of the redetection result of the magnetic head; and when the character recognition process is performed based on the redetection result data, a portion of the character recognition process is omitted based on the number of characters specified by the recognition-completed character number information.

4. The magnetic ink character reading apparatus according to claim 2, further comprising a recognition-completed character number information storage unit that stores recognition-completed character number information for specifying the number of recognition-completed characters, wherein:

when the recognition of the character recognition unit is limited, the apparatus causes the magnetic head to redetect the variation in the magnetic flux intensities on the magnetic ink characters recorded on the recording medium, and thereafter the character recognition process is performed based on redetection result data indicative of the redetection result of the magnetic head; and when the character recognition process is performed based on the redetection result data, a portion of the character recognition process is omitted based on the number of characters specified by the recognition-completed character number information.

5. The magnetic ink character reading apparatus according to claim 1, further comprising:

a second similarity determining unit; and a second character recognition unit, wherein:

the similarity acquisition unit acquires the similarity for each of the plurality of magnetic ink characters in a sequential manner;

whenever the similarity is acquired by the similarity acquisition unit, the second similarity determining unit determines whether the similarity is greater than a second predetermined reference similarity; and when the similarity of one of the plurality of magnetic ink characters is greater than the second predetermined reference similarity, the second character recognition unit recognizes the one magnetic ink character as the magnetic ink character corresponding to the one-character-corresponding data; and when the recognition of the second character recognition unit is performed, the similarity acquisition of the similarity acquisition unit is limited.

6. The magnetic ink character reading apparatus according to claim 2, further comprising:

a second similarity determining unit; and a second character recognition unit, wherein:

the similarity acquisition unit acquires the similarity for each of the plurality of magnetic ink characters in a sequential manner;

whenever the similarity is acquired by the similarity acquisition unit, the second similarity determining unit determines whether the similarity is greater than a second predetermined reference similarity; and when the similarity of one of the plurality of magnetic ink characters is greater than the second predetermined reference similarity, the second character recognition unit recognizes the one magnetic ink character as the magnetic ink character corresponding to the one-character-corresponding data; and when the recognition of the second character recognition unit is performed, the similarity acquisition of the similarity acquisition unit is limited.

7. The magnetic ink character reading apparatus according to claim 3, further comprising:

a second similarity determining unit; and a second character recognition unit, wherein:

the similarity acquisition unit acquires the similarity for each of the plurality of magnetic ink characters in a sequential manner;

whenever the similarity is acquired by the similarity acquisition unit, the second similarity determining unit determines whether the similarity is greater than a second predetermined reference similarity; and when the similarity of one of the plurality of magnetic ink characters is greater than the second predetermined reference similarity, the second character recognition unit recognizes the one magnetic ink character as the magnetic ink character corresponding to the one-character-corresponding data; and when the recognition of the second character recognition unit is performed, the similarity acquisition of the similarity acquisition unit is limited.

8. The magnetic ink character reading apparatus according to claim 4, further comprising:

a second similarity determining unit; and a second character recognition unit, wherein:

the similarity acquisition unit acquires the similarity for each of the plurality of magnetic ink characters in a sequential manner;

whenever the similarity is acquired by the similarity acquisition unit, the second similarity determining unit determines whether the similarity is greater than a second predetermined reference similarity; and when the similarity of one of the plurality of magnetic ink characters is greater than the second predetermined reference similarity, the second character recognition unit recognizes the one magnetic ink character as the magnetic ink character corresponding to the one-character-corresponding data; and when the recognition of the second character recognition unit is performed, the similarity acquisition of the similarity acquisition unit is limited.

9. A method of controlling a magnetic ink character reading apparatus including a magnetic head that detects a variation in magnetic flux intensities on magnetic ink characters, in which a character recognition process is performed based on detection result data indicative of the detection result of the magnetic head so as to recognize the magnetic ink characters recorded on a recording medium on a character-by-character basis, the method comprising:

acquiring reference data corresponding to a plurality of magnetic ink characters, respectively;

extracting data corresponding to one character from the detection result data;

acquiring a similarity between the one-character-corresponding data and reference data corresponding to the magnetic ink characters, the similarity acquisition being performed for each of the plurality of magnetic ink characters;

recognizing the magnetic ink character of which the similarity acquired in the similarity acquisition step is the highest among the plurality of magnetic ink characters as the magnetic ink character corresponding to the one-character-corresponding data;

determining whether a difference between the highest similarity and the second highest similarity among the similarities acquired in the similarity acquisition is smaller than a predetermined reference difference; and limiting the recognition in the character recognition based on the determination result in the similarity difference determining.

* * * * *